US008959328B2

(12) United States Patent
Li et al.

(10) Patent No.: US 8,959,328 B2
(45) Date of Patent: Feb. 17, 2015

(54) DEVICE, SYSTEM, AND METHOD FOR MULTI-RESOURCE SCHEDULING

(75) Inventors: Tong Li, Portland, OR (US); Scott Hahn, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1729 days.

(21) Appl. No.: 11/980,000

(22) Filed: Nov. 13, 2007

(65) Prior Publication Data
US 2009/0125909 A1 May 14, 2009

(51) Int. Cl.
*G06F 1/00* (2006.01)
*G06F 9/48* (2006.01)
*G06F 9/50* (2006.01)

(52) U.S. Cl.
CPC ............................. *G06F 9/5038* (2013.01)
USPC ................... 713/100; 718/103; 718/104

(58) Field of Classification Search
CPC .... G06F 9/4812; G06F 9/4887; G06F 9/5038
USPC ......................................... 718/103; 713/300
See application file for complete search history.

(56) References Cited

U.S. PATENT DOCUMENTS

| | | | | |
|---|---|---|---|---|
| 4,642,756 A | * | 2/1987 | Sherrod | 718/103 |
| 5,210,872 A | * | 5/1993 | Ferguson et al. | 718/102 |
| 5,295,265 A | * | 3/1994 | Ducateau et al. | 718/100 |
| 6,457,008 B1 | * | 9/2002 | Rhee et al. | 1/1 |
| 7,120,715 B2 | * | 10/2006 | Chauvel et al. | 710/244 |
| 7,318,128 B1 | * | 1/2008 | Dice | 711/151 |
| 2003/0172104 A1 | * | 9/2003 | Hooman et al. | 709/103 |
| 2005/0246705 A1 | * | 11/2005 | Etelson et al. | 718/100 |
| 2006/0206881 A1 | * | 9/2006 | Dodge et al. | 717/140 |
| 2006/0206898 A1 | * | 9/2006 | Miner et al. | 718/104 |
| 2008/0034370 A1 | * | 2/2008 | Huizenga | 718/104 |
| 2008/0178188 A1 | * | 7/2008 | Cooke et al. | 718/104 |
| 2008/0235701 A1 | * | 9/2008 | Danko | 718/104 |
| 2009/0055829 A1 | * | 2/2009 | Gibson | 718/103 |

OTHER PUBLICATIONS

B. Caprita, J. Nieh, and C. Stein. "Grouped distributed queues: Distributed queue, proportional share multiprocessor scheduling. In Proceedings of the 25th ACM Symposium on Principles of Distributed Computing", pp. 72-81, Jul. 2006.

* cited by examiner

*Primary Examiner* — Kim Huynh
*Assistant Examiner* — Brandon Kinsey
(74) *Attorney, Agent, or Firm* — Hanley, Flight & Zimmerman, LLC

(57) ABSTRACT

A method, apparatus and system for selecting a highest prioritized task for executing a resource from one of a first and second expired scheduling arrays, where the first and second expired scheduling arrays may prioritize tasks for using the resource, and where tasks in the first expired scheduling array may be prioritized according to a proportionality mechanism and tasks in the second expired scheduling array may be prioritized according to an importance factor determined, for example, based on user input, and executing the task. Other embodiments are described and claimed.

23 Claims, 5 Drawing Sheets

DEVICE, SYSTEM, AND METHOD FOR MULTI-RESOURCE SCHEDULING

BACKGROUND OF THE INVENTION

Scheduling processing resources in a time-sharing system is one of the most critical tasks for any multi-resource operating system. A resource scheduler may apportion central processing unit (CPU) time to runnable resources in small time intervals, according to a scheduling policy. Since the scheduler runs for example every time interval, it may need to run efficiently regardless of the number of processes or processors in the system. Proportional sharing, or fair-share scheduling, is a scheduling policy that may allocate CPU time to each resources in a multi-resource system that is proportion to its assigned weight.

A multi-resource system may for example, contain M resources. If there are for example N tasks sharing the M resources, each task may be assigned a priority that may determine an order in which the task is given access to each resource. Furthermore, each task may be assigned a weight, for example, based on the quality of service requirement information associated with the task. The weight assigned to the task may for example, correspond to the length of time the task may use a resource relative to other tasks. For example, if two tasks have weights 1 and 3, then the ratio of the time that each task uses the shared resources may be 1 to 3. Ideally, a proportional-share scheduler may ensure that, during any time interval, each task may use each appropriate resource for a length of time proportional to the task's weight. Such a guarantee may require that, as the number of tasks grows, for a time interval, the tasks may be scheduled with infinitesimally small intervals of time. In practice, no an algorithm may achieve this guarantee for all possible time intervals.

However, a multi-resource scheduling mechanism that better approximates the ideal scheduler is desirable.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
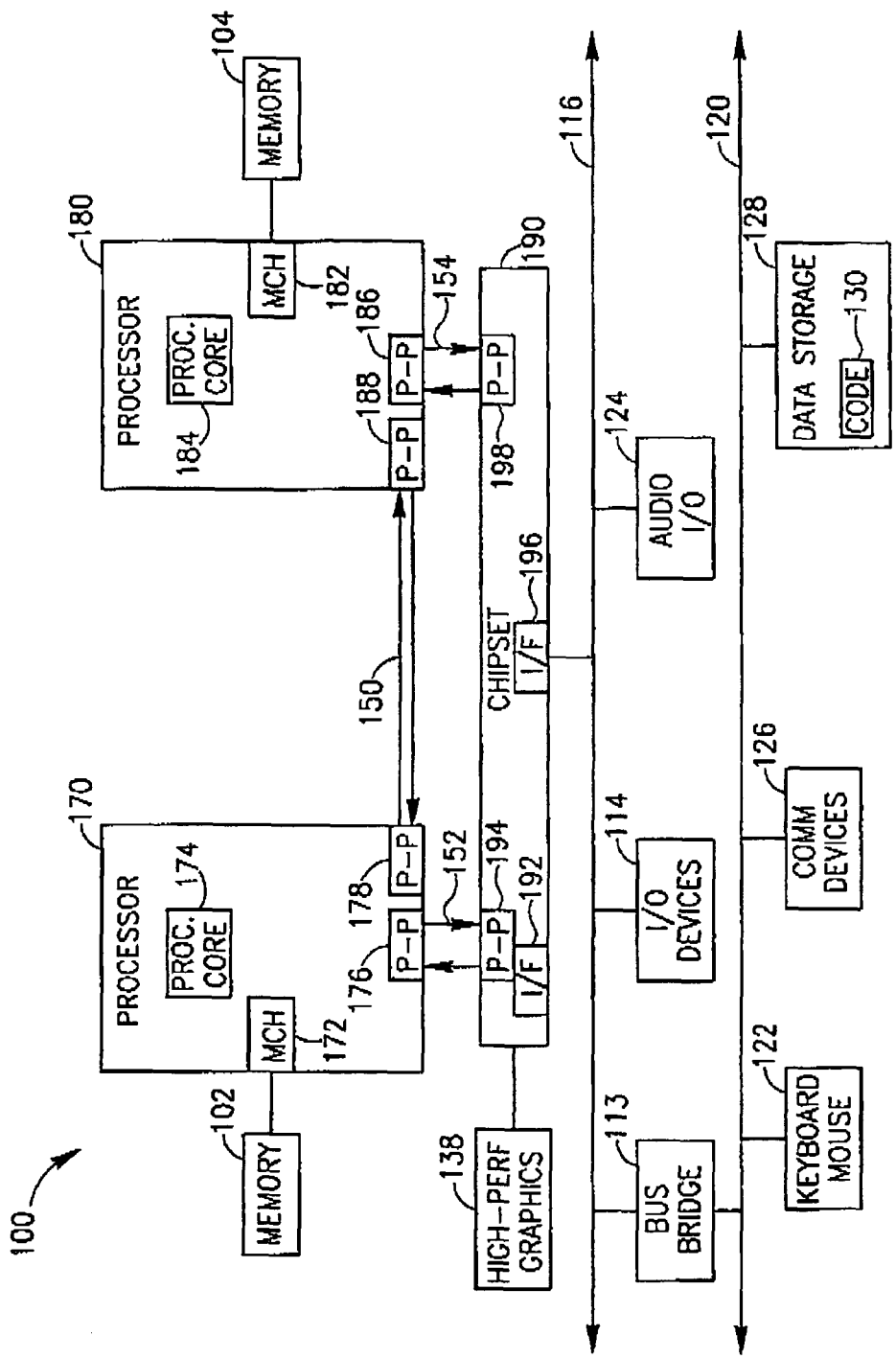
FIG. 1 is a schematic illustration of a computing system according to a demonstrative embodiment of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Although embodiments of the invention are not limited in this regard, the term "deactivated" or "idle" modes as used herein may include, for example, a standby mode, a power conservation mode, reduced power mode, an efficiency mode, a "sleep" mode, a semi-operational mode, a semi-active mode, a partially-active mode, or other modes of operations in which a component, such as a transceiver or a sub-unit thereof, is not fully operational and/or active.

It should be understood that the present invention may be used in a variety of applications. Although the present invention is not limited in this respect, the circuits and techniques disclosed herein may be used in many apparatuses such as personal computers (PCs), stations of a radio system, wireless communication system, digital communication system, satellite communication system, and the like.

Embodiments of the invention may be used in a variety of applications, apparatuses and systems, for example, stations including transmitters, receivers, transceivers, transmitter-receivers, wireless communication stations, wireless communication devices, modems, personal computers, desktop computers, mobile computers, laptop computers, notebook computers, personal digital assistant (PDA) devices, tablet computers, server computers, devices and/or networks operating in accordance with standards such as existing IEEE 802.11 standard ("IEEE Standard for Wireless LAN Medium Access Control (MAC) and Physical Layer (PHY) Specification, 1999 Edition", reaffirmed Jun. 12, 2003), such as the 802.11a, 802.11b, 802.11e, 802.11g, 802.11h, 802.11i, 802.11n, or 802.16 standards ("IEEE Standard for Local and Metropolitan Area Networks—Part 16: Air Interface for Fixed Broadband Wireless Access System", Oct. 1, 2004), and/or future versions of the above standards, one way and/or two-way radio communication systems, cellular radio-telephone communication systems, cellular telephones, wireless telephones, personal communication systems (PCS) devices, or the like. Embodiments of the invention may be used in various other apparatuses, devices, systems and/or networks.

Embodiments of the invention may provide a multi-resource proportional-share scheduling method or algorithm, which may be referred to, for example, as a distributed weighted round-robin (DWRR) algorithm. An embodiment may schedule multiple tasks (e.g., application threads), which may, for example, time-share resources and have different quality of service (QoS) requirements associated with the resources. Embodiments of the invention may be implemented in software (e.g., an operating system or virtual machine monitor), hardware (e.g., a cache or memory controller), or any combination thereof, such as controllers or CPUs and cache or memory.

Embodiments of the invention may provide a multi-resource scheduling method or algorithm that may, for example, minimize overhead or computations of processors or controllers (e.g., processors 170 and 180, described below in reference to FIG. 1). For example, a function, O(1), may be defined for measuring the scheduling overhead of the system or components thereof. In one embodiment, the multi-resource scheduling method or algorithm that may be designed, for example, to be highly scalable with O(1) scheduling overhead and distributed task data structures. For example, the scheduling method may be designed to minimize the O(1) function.

Embodiments of the invention may provide substantially accurate proportional-share scheduling that may approximate an ideal scheduler, as discussed herein, with error bounded by a substantially constant and/or small measure. Embodiments may provide substantially efficient support for latency-sensitive tasks (e.g., such as interactive tasks).

Reference is made to FIG. 1, which schematically illustrates a computing system 100 in accordance with one demonstrative embodiment of the present invention. It will be appreciated by those skilled in the art that the simplified components schematically illustrated in FIG. 1 are intended for demonstration purposes only, and that other components may be required for operation of system 100. Those of skill in the art will further note that the connection between components in a system need not necessarily be exactly as depicted in the schematic diagram.

System 100 may include, for example, a point-to-point busing scheme having one or more controllers or processors, e.g., processors 170 and 180; memories, e.g., memories 102 and 104 which may be external to processors 170 and 180; and/or input/output (I/O) devices, e.g., devices 114, interconnected by one or more point-to-point interfaces. Processors 170 and 180 may include, for example, a central processing unit (CPU), a digital signal processor (DSP), a microprocessor, a host processor, a plurality of processors, a controller, a chip, a microchip, or any other suitable multi-purpose or specific processor or controller. Memories 102 and 104 may be for example dynamic RAM (DRAM) or static RAM (SRAM), or may be other types of memories. Processors 170 and/or 180 may include processor cores 174 and 184, respectively. Processor cores 174 and/or 184 may include a one or more storage units 105, processor pipeline(s) 118, and any other suitable elements. Processor execution pipeline(s) 118 which may include, for example, fetch, decode, execute and retire mechanisms. Other pipeline components or mechanisms may be used.

According to some embodiments of the invention, processors 170 and 180 may also include respective local memory channel hubs (MCH) 172 and 182, e.g. to connect with memories 102 and 104, respectively. Processors 170 and 180 may exchange data via a point-to-point interface 150, e.g., using point-to-point interface circuits 178, 188, respectively. Processors 170 and/or 180 may exchange data with a chipset 190 via point-to-point interfaces 152, 154, e.g., using point to point interface circuits 176, 194, 186, and 198. Chipset 190 may also exchange data with a high-performance graphics circuit 138 via a high-performance graphics interface 192. Chipset 190 may also exchange data with a bus 116 via a bus interface 196. Bus 116, may include, for example, a "front side bus" (FSB). For example, bus 116 may be a CPU data bus able to carry information between processors 170 and/or 180, and other devices of computing system 100. For example, bus 116 may connect between processors 170 and/or 180 and a chipset (CS) 190. Although the invention is not limited in this respect, chipset 190 may include one or more motherboard chips, e.g., a "northbridge" and a "southbridge", and/or a "firmware hub", or other chips or chipsets. Chipset 190 may include connection points for additional buses and/or devices of computing system 100.

Input/output devices 114 may include, according to some embodiments, low performance graphics controllers, video controllers, and/or networking controllers, e.g., as are known in the art. System 100 may also include, according to some demonstrative embodiments another bus bridge 113, which may be used, for example, to permit data exchanges between bus 116 and a bus 120. Bus 120 may in some embodiments be a small computer system interface (SCSI) bus, an integrated drive electronics (IDE) bus, or a universal serial bus (USB) bus, e.g., as are known in the art. Additional I/O devices may be connected to bus 120. For example, system 100 may also include, keyboard and/or a cursor control devices 122, e.g., a mouse; an audio I/O 124; communications devices 126, e.g., including modems and/or network interfaces; and/or data storage devices 128, e.g., to store software code 130. In some embodiments, data storage devices 128 may include a fixed magnetic disk, a floppy disk drive, an optical disk drive, a magneto-optical disk drive, a magnetic tape, or non-volatile memory including flash memory.

According to some embodiments of the invention, for each resource (e.g., CPU processing, memory, access to a special processor, access to external wired or wireless devices, etc.), tasks (e.g., security control, running applications, etc.) may be scheduled or prioritized for accessing the resource according to multiple distinct scheduling mechanisms. Tasks and resources other than those listed here may be used. For example, for each resource, tasks may be assigned multiple priority values determined by each of the multiple distinct scheduling mechanisms for accessing each resource. In some embodiments, the multiple scheduling mechanisms provide a disparate or conflicting prioritization of tasks.

Figure 2:
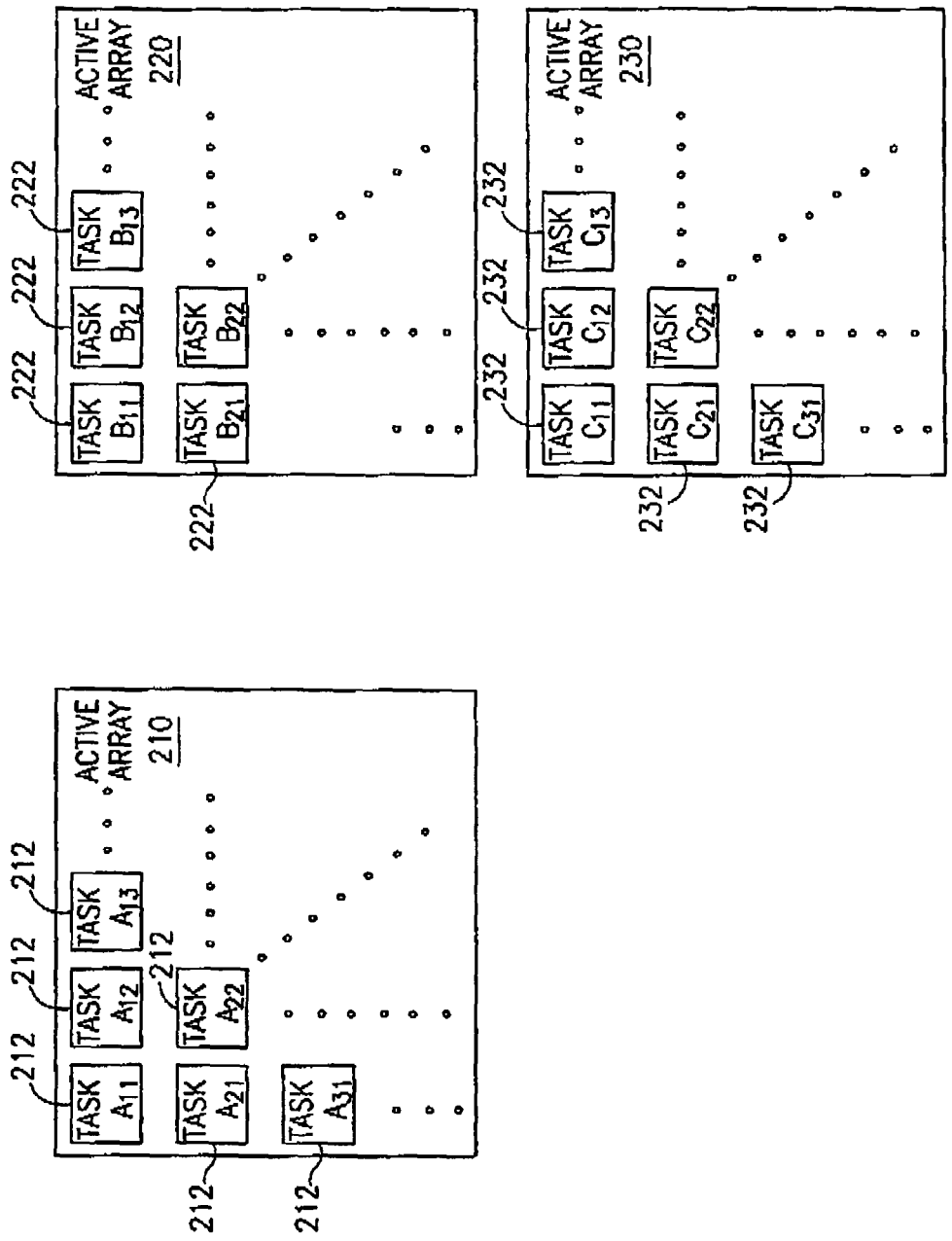
FIG. 2 is a schematic illustration of a data structure according to a demonstrative embodiment of the present invention.

Reference is made to FIG. 2, which schematically illustrates a data structure according to an embodiment of the present invention. According to some embodiments of the invention, for each resource, different scheduling mechanisms may list or store tasks according to the distinct prioritization, in separate data structures, databases, or arrays, for example providing multiple and distinct data structures or arrays. In one embodiment of the invention, for each resource, tasks may be stored in data structures or databases including, for example, an active array 210, and two expired arrays, for example, a first expired array 220 (e.g., a time slice expired array), and a second expired array 230 (e.g., a round-expired array). The two expired arrays 220 and 230 may schedule or prioritize (e.g., inactive) tasks for using a specific resource.

In some embodiments, expired arrays 220 and 230 may schedule tasks according to different factors or priorities. For example, first expired scheduling array 220 may prioritize tasks according to a proportionality mechanism and second expired scheduling array 230 may prioritize tasks according to an importance factor, for example, determined based on user input. Operating multiple expired arrays, each which schedule the use of a resource according to substantially different scheduling mechanisms may provide a more detailed and accurate scheduling of the resource, which may for example, consider more factors than in conventional scheduling models. Other types of arrays or data structures, defining different ordering mechanisms, may be used. Some or all of active array 210, expired array 220, and round-expired array 230, may be two dimensional arrays with for example, one dimension reflecting a priority values (e.g., increase proportional to the row number) and another dimension reflecting the various tasks associated with each of the priority values. Thus, each array entry 212, 222, and/or 232, in arrays 210, 220, and/or 230, respectively, may correspond to a different priority value and a set or reference to tasks that have that priority. For example, tasks $A_{11}, A_{12}, A_{13}, \ldots$ may have the same priority values. Likewise, tasks $A_{21}, A_{22}, A_{23}, \ldots$ may have the same priority values, but each of tasks $A_{11}, A_{12}, A_{13}, \ldots$ may have a higher priority value than each of tasks $A_{21}, A_2, A_{23}$, etc.

According to some embodiments of the invention, for each resource, a DWRR algorithm may maintain an active, a first expired, and second (e.g., round) expired arrays 210, 220, and/or 230, a "round number", and a "timer". Other numbers and types of arrays may be used. In some embodiments, a counter such as a round number stored in a register, memory or other data structure may keep track of the round or iteration in which each resource may be used. The round number may be the number of times or sessions a resource has been used, for example, by a task, over a interval of time or during a set of processes. In some embodiments, the round number may be initially normalized or set to for example zero. In some embodiments, at any time, if a resource's round number is R, then the DWRR mechanism may define that all tasks in the resource's active and expired arrays 210 and 220 may be running in round R and that all tasks in round-expired array 230 have finished round R, and are awaiting to start round R+1. In some embodiments, a timer periodically triggers an interruption (e.g., in the processor) of the allocation of the resources (e.g., with a periodicity of an interrupt interval) for scheduling or selecting a highest priority task. The interrupt interval may be a tunable parameter. For example, interrupt interval may be 1 ms; other time intervals may be used.

According to some embodiments of the invention, for each task, the DWRR algorithm may maintain a time slice value, a round slice value, and a resource time. In some embodiments, a time slice value may be proportional to the priority of a task. For example, the higher a task's priority, the larger the time slice associated therewith. The exact proportion of priority to time slice size may be a design parameter. In some embodiments, the time slice may be the time that the task has used the resource. For example, if the resource allocated is the CPU core, time slice may be the duration of time the task has used the CPU core. In some embodiments, a round slice value may be the total time that the task may use any of the resources in a round. For example, the round slice value may proportional to w*B, where w is the weight of the task and B is a system default constant (e.g., 100 ms). In some embodiments, a resource time may be the total time that a task has been using any of the resources. In some embodiments, the DWRR algorithm may maintain a global variable, which may be approximately equivalent to the maximum round number for a task, among all the resources.

System 100 may be implemented as a virtual machine. However, persons of ordinary skill in the art will appreciate that the methods and apparatus to perform secure boot described herein may be accomplished on any system having, for example, a single CPU and a single OS, a single CPU with multiple virtual modes, and/or a platform having multiple CPUs.

Figure 3A:
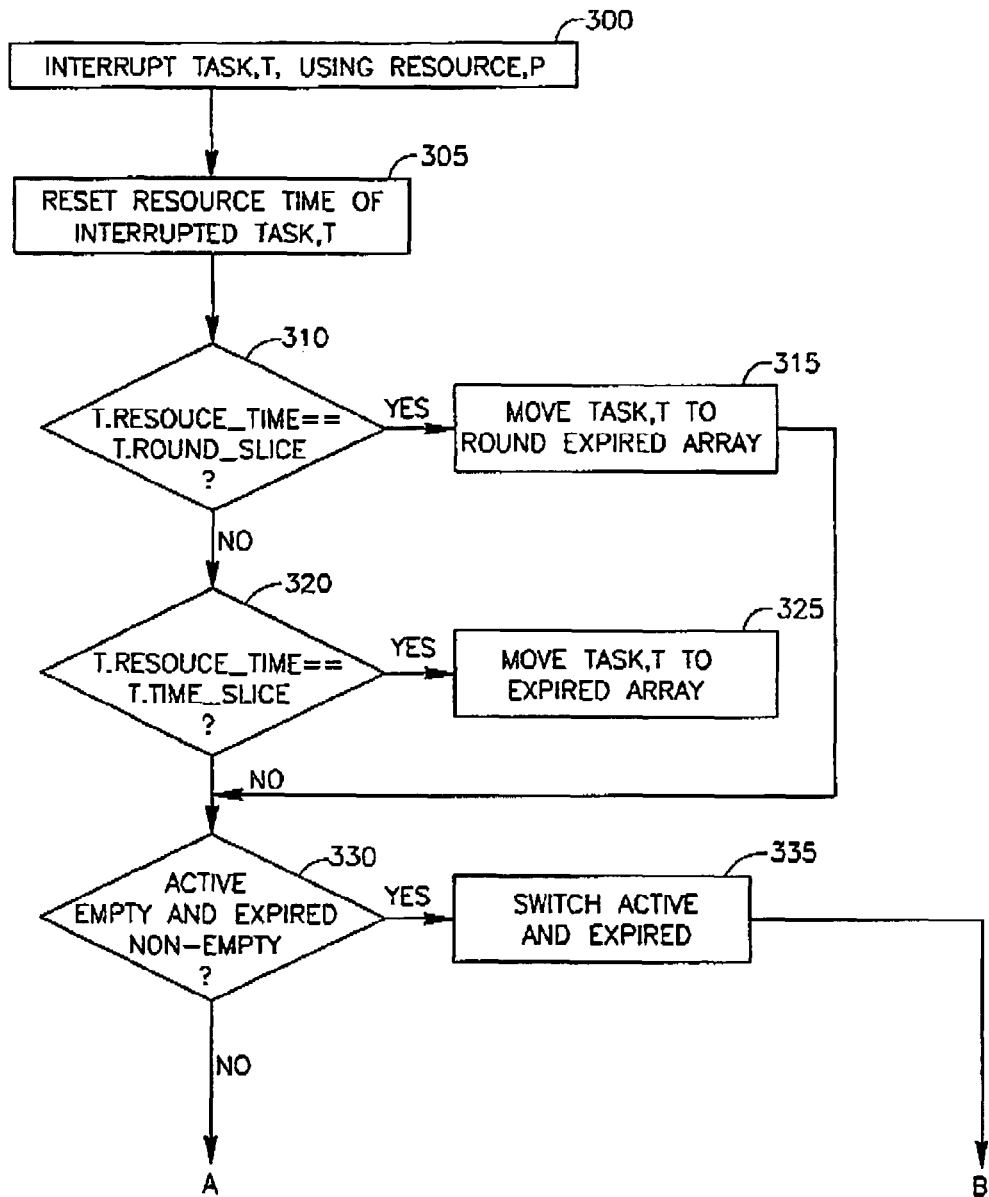
FIGS. 3A and 3B are flow charts of a method according to a demonstrative embodiment of the present invention.
Figure 3B:
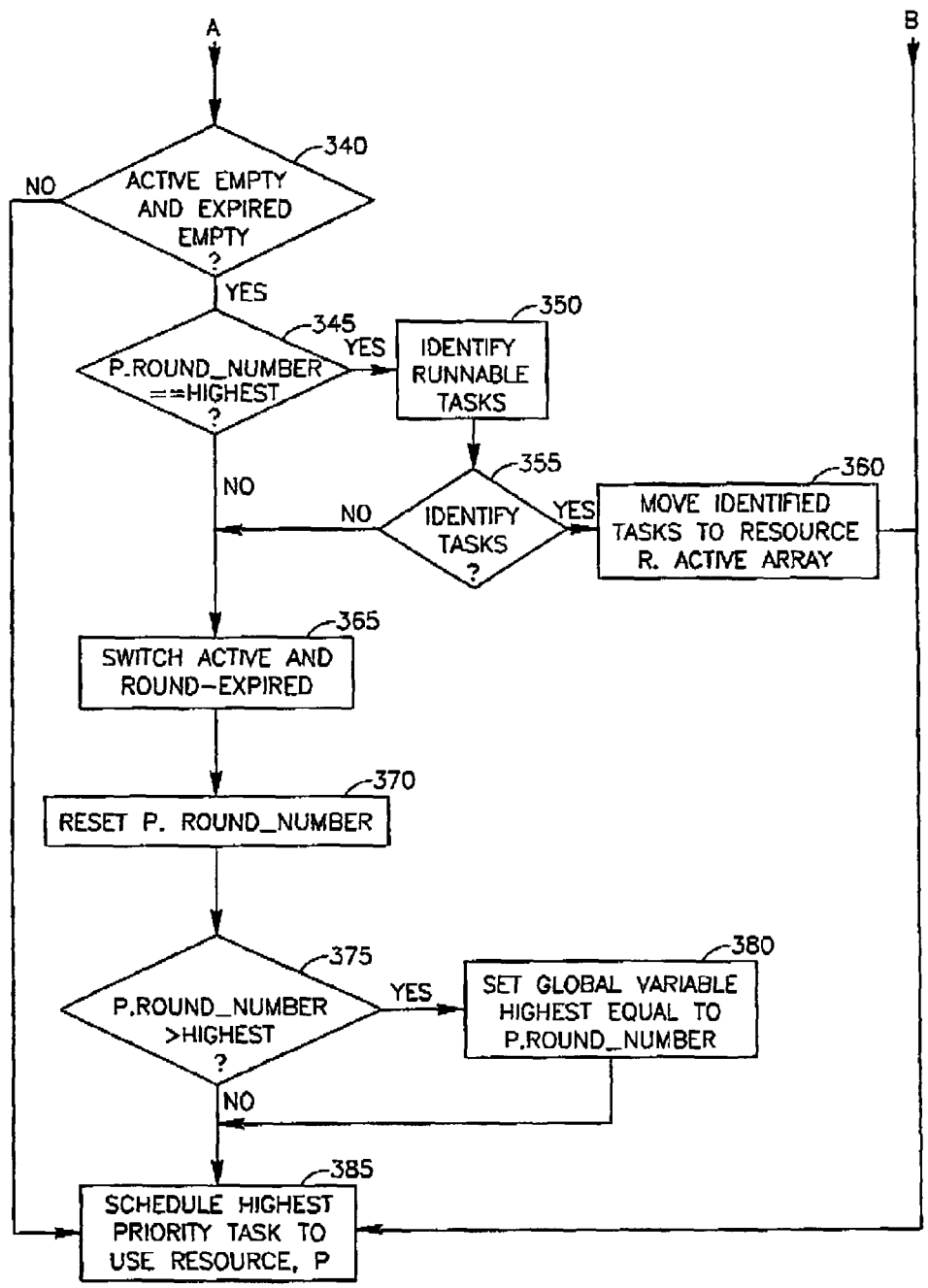
Figure 3C:
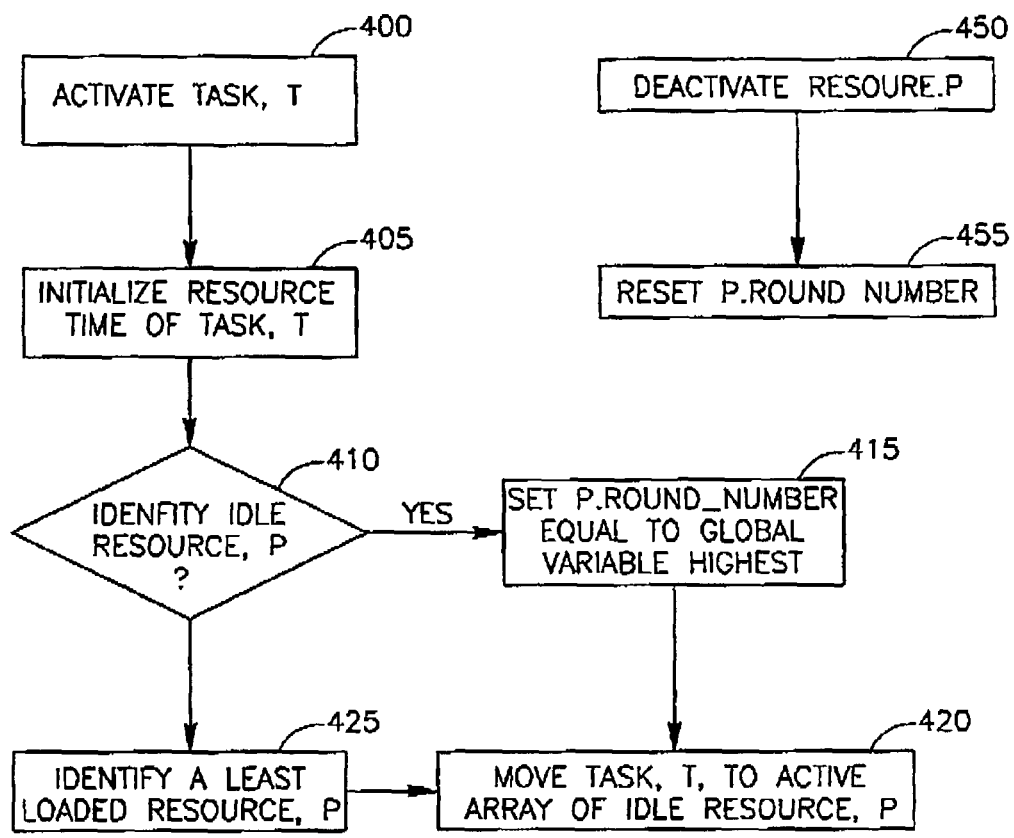
FIG. 3C is a flow chart of a method according to a demonstrative embodiment of the present invention.

Reference is made to FIGS. 3A, 3B and 3C, which are flow charts of methods according to a demonstrative embodiment of the present invention.

FIG. 3A and FIG. 3B are flowcharts of an embodiment scheduling or selecting a highest prioritized task for executing a resource from for example one of two of the resource's expired arrays, for example, including an expired scheduling array and a round-expired scheduling array. In some embodiments, tasks in the resource's expired scheduling array may be prioritized according to proportionality, time share, or other suitable mechanisms. In some embodiments, tasks in the resource's round-expired scheduling array may be prioritized according to an importance factor, for example, determined based on user input, or other suitable scheduling mechanisms. Arrays or other data structures may be stored in storage or memory (e.g., memories 102 and/or 104).

In operation 300, a DWRR mechanism may trigger an interruption of the use of a resource by a task, T. Task, T, may be located in the active array of the resource, P, which is described above in reference to FIG. 2. In some embodiments, the interruption may be determined by a timer of a resource, P. In some embodiments, the interruption may be periodic and the periodicity may be determined by the DWRR mechanism, the resource timer, CPU or system needs, or input by a user. Periodically interrupting need not imply interrupting according to fixed or repeating time schemes. Periodically interrupting may include interrupting using time schemes supported by embodiments of the invention, for example, variable time schemes. Time schemes or interrupting schemes may be fixed, repeating, variable or random.

In operation 305, the resource time of the task, T, which may have been using the resource, P, before the interrupt occurred, may be modified or reset. For example, the resource time of the task, T, may be reset at an increment, decrement, or other suitable change. For example, the resource time may be increased by one. In other embodiments, the resource time may be increased (e.g., or decreased) by a fixed, repeating, variable or random, number.

In operation 310, the DWRR mechanism may determine if the resource time of the interrupted task, T, is approximately equal to the round slice of interrupted task, T. For example, a process may execute:

Compute T.resource_time==T.round_slice?

If the answer is yes, the process may proceed to operation 315.

If the answer is no, the process may proceed to operation 320.

In operation 315, the DWRR mechanism may move an interrupted task, T, from the resource's active array to the resource's round-expired array. The position of task T in the round-expired array may be the same as its previous position in the active array, for example, determined by its priority. In other embodiments, the position of task T may be reset or rearranged.

In operation 320, the DWRR mechanism may determine if the resource time of the interrupted task, T, is approximately equal to the time slice of interrupted task, T. For example, a process may execute:

Ccompute T.resource_time==T.time_slice?

If the answer is yes, the process may proceed to operation 325.

If the answer is no, the process may proceed to operation 330.

In operation 325, the DWRR mechanism may move interrupted task, T, from the resource's active array to the resource's expired array if the resource time of the interrupted task, T.

In operation 330, the DWRR mechanism may determine if the resource's active array is empty and expired array is non-empty. If the answer is yes, the process may proceed to operation 335. If the answer is no, the process may proceed to operation 340.

In operation 335, the DWRR mechanism may switch the functionality of the resource's active and expired arrays. For example, the resource's expired array may be active and the tasks located therein may use the resource (e.g., according to their prioritization) and the resource's active array may be inactive and the tasks located therein may not use the resource. Operation 385 may follow.

In operation 340, the DWRR mechanism may determine if the resource's active array is empty and expired array is empty. If the answer is yes, a process may proceed to operation 345. If the answer is no, a process may proceed to operation 385.

In operation 345, the DWRR mechanism may determine if the current round number, R, of resource, P, is the highest round number, for example, approximately equal to the global variable highest. For example, a process may execute:

Compute P.round_number==highest?

If the answer is yes, the process may proceed to operation 350.

If the answer is no, the process may proceed to operation 365.

In operation 350, the DWRR mechanism may identify runnable tasks that are in a round approximately equal to the global variable highest, but not currently running. Runnable tasks may include, for example, tasks in the active or expired arrays of a resource with a round number approximately equal to the global variable highest (e.g., P.round_number==highest), and tasks in the round-expired array of a resource with a round number approximately equal to, for example, one unit less than the global variable highest (e.g., P.round_number==highest−1). In other embodiments, other tasks, for example, with other round numbers, may be considered runnable.

In operation 355, the DWRR mechanism may determine if a non-zero number of tasks were identified in operation 350. If the answer is yes, a process may proceed to operation 360. If the answer is no, a process may proceed to operation 365.

In operation 360, the DWRR mechanism may move one or more of the identified tasks to the resource's active array. For example, a task having a round number approximately equal to the maximum value of the round numbers associated with the tasks in the second expired array may be selected and moved to the resource's active array. In some embodiments, a number of tasks, X, may be moved. For example, number, X, may be a design parameter and may be defined and/or modified according to system 100 needs. In some embodiments, number, X, may be fixed, repeating, variable or random. The process may proceed to operation 385.

In operation 365, the DWRR mechanism may switch the functionality of the resource's active and round-expired arrays, when the active array is empty and the round-expired array is non-empty. In some embodiments, the resource's round-expired array may be activated and the resource's active array may for example be inactivated.

In operation 370, if the round number, R, of resource, P, is not approximately equal to the global variable highest, the DWRR mechanism may increment the round number, R, for example, by one. Thus, tasks in the round-expired array may advance to the next round.

In operation 375, the DWRR mechanism may determine if the round number, R, of resource, P, is greater than the global variable highest. If the answer is yes, the process may proceed to operation 380. If the answer is no, the process may proceed to operation 385. In some embodiments, a highest prioritized task may be selected when the task has a round number approximately greater than or equal to the global variable highest.

In operation 380, if the new round number of P, set in operation 370, is greater than global variable highest, the DWRR mechanism may set the new round number of P to be the new value for global variable highest.

In operation 385, the DWRR mechanism may schedule the highest priority task in the resource's active array to use the resource next. If multiple tasks have approximately the same highest priority, the DWRR mechanism may schedule them in a round-robin, random, or other suitable, order.

Other operations or series of operations may be used.

FIG. 3C is a flowchart of an embodiment executing a resource, where a task is scheduled according to embodiments of the invention, for example, described above in FIG. 3A and FIG. 3B. In some embodiments, the task executing the resource may be a highest prioritized task and may be accessed from either the resource's expired scheduling array or the resource's round-expired scheduling arm.

In operation 400, a DWRR mechanism may activate a task, T. For example, the DWRR mechanism may create a new task or activate an inactive task, for example, awaken an old task from a sleep mode.

In operation 405, a DWRR mechanism may initialize the resource time of task, T, for example, to zero. For example, a process may set T.resource_time=0.

In operation 410, a DWRR mechanism may identify if there is an idle resource available. For example, the DWRR mechanism may search for a resource, P, which no task is using or that has an empty active array (e.g., or having substantially no tasks listed or stored). If there is an idle resource available, a process may proceed to operation 415. If there is not an idle resource available, a process may proceed to operation 425.

In operation 415, a DWRR mechanism may set the identified resource's round number to the current value of the global variable highest. For example, a process may reset P.round_number for example to the Global Variable Highest.

In operation 420, a DWRR mechanism may move task, T, to the active array of idle resource, P. Thus, task, T, may use the idle resource, P.

In operation 425, a DWRR mechanism may identify a least loaded resource, P. For example, the least loaded resource may be the highest round resource with the fewest tasks in its active array. If multiple highest round resources have approximately the same fewest tasks in their active arrays, the DWRR mechanism may select a least loaded resource in a round-robin, random, or other suitable, manner. Then, a process may proceed to operation 420 and move task, T, to the active array of least loaded resource, P.

In operation 450, a resource, P, may be deactivated. For example, a relatively large number or substantially all of the tasks in the resource's active, expired, and round-expired arrays (e.g., arrays 210, 220, and/or 230, described above in reference to FIG. 2) may be terminated or in a deactivated or sleep mode.

In operation 455, a DWRR mechanism may reset the round number, R, for example, to zero.

Other operations or series of operations may be used.

Embodiments of the invention provide a method for distributing data structures, for example, including an active, expired, and round-expired local array for substantially each resource. Thus, embodiments of the invention need not rely on global queue to store all tasks and may therefore provide more efficient scheduling for large numbers of tasks and resources.

Embodiments of the invention may provide a method for scheduling by ordering a limited number of, for example a single highest priority task (e.g., for accessing a resource), from among the total number, N, of tasks. For example, scheduling tasks according to embodiments of the present invention may take a duration of time approximately equal to O(1) (e.g., a function for measuring the scheduling overhead of the system or components thereof), whereas conventional methods for scheduling by ordering all, for example N, tasks, may take a duration of time approximately equal to O(logN).

Embodiments of the invention may provide a method for scheduling according to multiple factors, including for example, the priorities and weights of tasks. Thus, embodiments of the invention provide a method for proportional-share scheduling as well as support for latency-sensitive tasks, such as interactive and input/output tasks.

Embodiments of the invention may include a computer readable medium, such as for example a memory, a disk drive, or a "disk-on-key", including instructions which when executed by a processor or controller, carry out methods disclosed herein.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. A method to manage execution of a task in a multi-resource system, comprising:
    interrupting the task in a first array executing on a first resource of the multi-resource system;
    calculating a global utilization time indicating a collective amount of time the task collectively executed on a set of resources of the multi-resource system, the set of resources including the first resource and a second resource;
    calculating a local utilization time indicating an amount of time the task executed on the first resource of the multi-resource system;
    when the global utilization time of the task satisfies a first threshold value, preventing the task from executing on any of the resources in the set of resources; and
    when the global utilization time does not satisfy the first threshold value, and the local utilization time satisfies a second threshold value, allowing the task to execute on any resource in the set of resources except the first resource.

2. A method as defined in claim 1, further comprising moving the task to an expired array in response to the global utilization time satisfying the first threshold value.

3. A method as defined in claim 1, further comprising moving the task to an expired array to indicate that the task is available for execution by the second resource of the multi-resource system in response to the local utilization time satisfying the second threshold and the global utilization threshold not satisfying the first threshold.

4. A method as defined in claim 1, wherein the first array comprises an active task array to indicate that the task may be executed by any one of the resources of the multi-resource system.

5. A method as defined in claim 1, wherein an expired array prioritizes tasks based on each resource utilization proportionality in the multi-resource system.

6. A method as defined in claim 1, wherein an expired array prioritizes tasks based on a quality of service requirement.

7. A method as defined in claim 1, further comprising calculating a total time value available to the task based on a product of a task weight and a default constant associated with the multi-resource system.

8. A method as defined in claim 1, further comprising periodically interrupting the first task in the first array to adjust a priority of the first task.

9. A method as defined in claim 1, further comprising moving a plurality of tasks satisfying the global utilization time in an expired array to the first array to execute on the first resource when the first array is empty and the expired array is non-empty.

10. An apparatus comprising:
    a processor to:
        interrupt a task in a first array executing on a first resource of a multi-resource system;
        calculate a global utilization time associated with an amount of time the task collectively executed on a set of all resources of the multi-resource system, the set of resources including the first resource and a second resource;
        calculate a local utilization time indicating an amount of time the task executed on the first resource of the multi-resource system;
        when the global utilization time of the task satisfies a first threshold value, prevent the task from executing on any of the resources in the set of resources; and
        when the global utilization time does not satisfy the first threshold value, and the local utilization time satisfies a second threshold value, allow the task to execute on any resource in the set of resources except the first resource.

11. An apparatus as defined in claim 10, wherein the processor is to move the task to an expired array based on the global utilization time satisfying the first threshold.

12. An apparatus as defined in claim 10, wherein the processor is to move the task to an expired array to indicate that the task is available for execution by the second resource of the multi-resource system in response to the local utilization time satisfying the second threshold and the global utilization time not satisfying the first threshold.

13. An apparatus as defined in claim 10, wherein the processor is to prioritize tasks in an expired array based on each resource utilization proportionality in the multi-resource system.

14. An apparatus as defined in claim 10, wherein the processor is to prioritize tasks in an expired array based on a quality of service requirement.

15. An apparatus as defined in claim 10, wherein the processor is to calculate a total time value available to the task based on the product of a task weight and a default constant associated with the multi-resource system.

16. An apparatus as defined in claim 10, wherein the processor is to periodically interrupt the first task in the first array to adjust a priority of the task.

17. An apparatus as defined in claim 10, wherein the processor is to move a plurality of tasks satisfying the global utilization time in an expired array to the first array to execute on the first resource when the first array is empty and the expired array is non-empty.

18. A tangible machine readable storage device or storage disk comprising instructions, which when executed, cause a machine to, at least:
    interrupt a task in a first array executing on a first resource of a multi-resource system;

calculate a global utilization time indicating a collective amount of time the task collectively executed on a set of resources of the multi-resource system, the set of resources including the first resource and a second resource;

calculate a local utilization time indicating an amount of time the task executed on the first resource of the multi-resource system;

prevent the task from executing on any resources in the set of resources when the global utilization time of the task satisfies a first threshold value; and allow the task to execute on any resource in the set of resources except the first resource when the global utilization time does not satisfy the first threshold value, and the local utilization time satisfies a second threshold value.

19. A machine readable storage device or storage disk as defined in claim 18, wherein the machine readable instructions, when executed, cause the machine to prioritize tasks based on each resource utilization proportionality in the multi-resource system.

20. A machine readable storage device or storage disk as defined in claim 18, wherein the machine readable instructions, when executed, cause the machine to prioritize tasks based on a quality of service requirement.

21. A machine readable storage device or storage disk as defined in claim 18, wherein the machine readable instructions, when executed, cause the machine to calculate a total time value available to the task based on a product of a task weight and a default constant associated with the multi-resource system.

22. A machine readable storage device or storage disk as defined in claim 18, wherein the machine readable instructions, when executed, cause the machine to periodically interrupt the task in the first array to adjust a priority of the task.

23. A machine readable storage device or storage disk as defined in claim 18, wherein the machine readable instructions, when executed, cause the machine to move a plurality of tasks satisfying the first utilization time in an expired array to the first array to execute on the first resource when the first array is empty and the expired array is non-empty.

* * * * *

UNITED STATES PATENT AND TRADEMARK OFFICE
CERTIFICATE OF CORRECTION

| | |
|---|---|
| PATENT NO. | : 8,959,328 B2 |
| APPLICATION NO. | : 11/980000 |
| DATED | : February 17, 2015 |
| INVENTOR(S) | : Li et al. |

Page 1 of 1

It is certified that error appears in the above-identified patent and that said Letters Patent is hereby corrected as shown below:

In the Claims:

Column 10, line 56 (Claim 16): after "interrupt the," delete "first".

Signed and Sealed this
Sixth Day of October, 2015

Michelle K. Lee
*Director of the United States Patent and Trademark Office*